United States Patent
Zhang et al.

(10) Patent No.: US 10,237,002 B2
(45) Date of Patent: Mar. 19, 2019

(54) METHOD FOR DETERMINING CALIBRATION PARAMETER OF ZERO INTERMEDIATE FREQUENCY RADIO RECEIVER, AND ZERO INTERMEDIATE FREQUENCY RADIO RECEIVER

(71) Applicant: HUAWEI TECHNOLOGIES CO., LTD., Shenzhen, Guangdong (CN)

(72) Inventors: Lie Zhang, Xi'an (CN); Jianxiong Bai, Xi'an (CN); Meifeng Li, Xi'an (CN); Qiang Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/009,571

(22) Filed: Jun. 15, 2018

(65) Prior Publication Data
US 2018/0294900 A1 Oct. 11, 2018

Related U.S. Application Data
(63) Continuation of application No. PCT/CN2015/097654, filed on Dec. 17, 2015.

(51) Int. Cl.
*H04B 17/00* (2015.01)
*H04B 1/26* (2006.01)
(Continued)

(52) U.S. Cl.
CPC ............ *H04B 17/21* (2015.01); *H04B 1/0071* (2013.01); *H04L 25/03* (2013.01)

(58) Field of Classification Search
CPC ... H04B 1/04; H04B 1/16; H04B 1/30; H04B 1/40; H04B 17/0085; H04B 17/11; H04B 17/21
(Continued)

(56) References Cited

U.S. PATENT DOCUMENTS 6,735,422 B1 * 5/2004 Baldwin ................ H03D 3/008
455/324
7,024,172 B1 * 4/2006 Murphy .................... H04B 1/30
455/313
(Continued)

FOREIGN PATENT DOCUMENTS

CN 101304395 A 11/2008
CN 101764625 A 6/2010
(Continued)

OTHER PUBLICATIONS

International Search Report dated Aug. 30, 2016 in corresponding International Patent Application No. PCT/CN2015/097654, 4 pgs.
(Continued)

*Primary Examiner* — Quochien B Vuong
(74) *Attorney, Agent, or Firm* — Staas & Halsey LLP

(57) ABSTRACT

A method for determining a calibration parameter of a zero intermediate frequency radio receiver, and a zero intermediate frequency radio receiver are provided. The method includes: obtaining a plurality of sub-band training signals, where a sum of the plurality of sub-band training signals is a fullband training signal; determining a sub-band calibration parameter corresponding to each of the plurality of sub-band training signals; determining a fullband calibration signal according to the plurality of sub-band training signals and the sub-band calibration parameter corresponding to each of the plurality of sub-band training signals; and performing coefficient fitting on the fullband training signal and the fullband calibration signal, to determine a fullband calibration parameter. Because sub-band calibration parameters are obtained according to a plurality of different sub-band training signals, aliasing between an image signal and a training signal is reduced. Therefore, a speed and
(Continued)

precision of determining a calibration parameter can be improved.

15 Claims, 2 Drawing Sheets

(51) Int. Cl.
*H04B 17/21* (2015.01)
*H04L 25/03* (2006.01)
*H04B 1/00* (2006.01)

(58) Field of Classification Search
USPC .............................. 455/67.11, 313, 323, 324
See application file for complete search history.

(56) References Cited

U.S. PATENT DOCUMENTS

| | | | |
|---|---|---|---|
| 7,991,102 B2* | 8/2011 | Chen ..................... | H03L 7/1976 375/376 |
| 9,106,471 B2* | 8/2015 | Patel ....................... | H04L 27/06 |
| 9,712,217 B2* | 7/2017 | Li .......................... | H04L 5/0025 |
| 2007/0080835 A1 | 4/2007 | Maeda et al. | |
| 2010/0150013 A1* | 6/2010 | Hara ................... | H04L 25/0224 370/252 |
| 2011/0228826 A1 | 9/2011 | Yokoo et al. | |
| 2013/0107765 A1 | 5/2013 | He | |

FOREIGN PATENT DOCUMENTS

| | | |
|---|---|---|
| CN | 102195914 A | 9/2011 |
| CN | 102594381 A | 7/2012 |
| CN | 103095321 A | 5/2013 |
| CN | 103414486 A | 11/2013 |
| WO | 2011/002601 A1 | 1/2011 |

OTHER PUBLICATIONS

International Search Report dated Aug. 30, 2016 in corresponding International Patent Application No. PCT/CN2015/097654.
Cristina De La Morena-Álvarez-Palencia et al., "Four-Octave Six-Port Receiver and Its Calibration for Broadband Communications and Software Defined Radios," Progress in Electromagnetics Research vol .116, dated Jan. 1, 2011, XP055516421 (22 pp.).
Extended European Search Report, dated Oct. 26, 2018, in European Application No. 15910524.6 (10 pp.).

* cited by examiner

METHOD FOR DETERMINING CALIBRATION PARAMETER OF ZERO INTERMEDIATE FREQUENCY RADIO RECEIVER, AND ZERO INTERMEDIATE FREQUENCY RADIO RECEIVER

CROSS-REFERENCE TO RELATED APPLICATIONS

This application is a continuation of International Application No. PCT/CN2015/097654, filed on Dec. 17, 2015, the disclosure of which is hereby incorporated by reference in its entirety.

TECHNICAL FIELD

Embodiments of the present invention relate to the field of communications technologies, and more specifically, to a method for determining a calibration parameter of a zero intermediate frequency radio receiver, and a zero intermediate frequency radio receiver.

BACKGROUND

In recent years, a zero intermediate frequency technology is widely applied to radio receivers. The zero intermediate frequency technology has the following advantages: Less intermediate frequency receiving links are used, and complexity of an intermediate frequency design, a size of a board, and hardware costs are reduced. A working principle of a zero intermediate frequency radio receiver is: A radio frequency analog signal is input to a quadrature demodulator, and the quadrature demodulator performs quadrature demodulation on the radio frequency analog signal and outputs a baseband composite signal to a digital signal processor. The quadrature demodulator cannot ensure an absolute quadrature, and image leakage occurs. Consequently, an image signal is generated. Such an image signal affects quality of a received signal in a radio receiver, and the received signal needs to be calibrated.

SUMMARY

Embodiments of the present invention provide a method for determining a calibration parameter of a zero intermediate frequency radio receiver, and a zero intermediate frequency radio receiver, so as to quickly determine a calibration parameter and provide a high-precision calibration parameter.

According to a first aspect, an embodiment of the present invention provides a method for determining a calibration parameter of a zero intermediate frequency radio receiver. The method includes: obtaining a plurality of sub-band training signals, where a sum of the plurality of sub-band training signals is a fullband training signal; determining a sub-band calibration parameter corresponding to each of the plurality of sub-band training signals; determining a fullband calibration signal according to the plurality of sub-band training signals and the sub-band calibration parameter corresponding to each of the plurality of sub-band training signals; and performing coefficient fitting on the fullband training signal and the fullband calibration signal, to determine a fullband calibration parameter. Because sub-band calibration parameters are obtained according to a plurality of different sub-band training signals, aliasing between an image signal and a training signal can be reduced. Therefore, a speed and precision of determining a calibration parameter can be improved.

With reference to the first aspect, in a first possible implementation of the first aspect, the determining a fullband calibration signal according to the plurality of sub-band training signals and the sub-band calibration parameter corresponding to each of the plurality of sub-band training signals includes: determining a plurality of sub-band calibration signals according to the plurality of sub-band training signals and the sub-band calibration parameter corresponding to each of the plurality of sub-band training signals; and determining a sum of the plurality of sub-band calibration signals as the fullband calibration signal.

With reference to the first aspect or the first possible implementation of the first aspect, in a second possible implementation of the first aspect, the determining a sub-band calibration parameter corresponding to each of the plurality of sub-band training signals includes: determining, through frequency-selective blind image calibration, the sub-band calibration parameter corresponding to each of the plurality of sub-band training signals.

With reference to the first aspect or either of the foregoing possible implementations of the first aspect, in a third possible implementation of the first aspect, bandwidths of any two of the plurality of sub-band training signals are equal. In this way, bandwidths of the sub-band training signals are equal, thereby avoiding an increase in computation complexity caused by a bandwidth difference.

With reference to the first aspect or any one of the foregoing possible implementations of the first aspect, in a fourth possible implementation of the first aspect, the obtaining a plurality of sub-band training signals includes: obtaining the plurality of sub-band training signals from a training signal generating device. In this way, no additional circuit needs to be disposed in the receiver.

According to a second aspect, an embodiment of the present invention provides a zero intermediate frequency radio receiver. The zero intermediate frequency radio receiver includes an obtaining unit and a determining unit. The obtaining unit and the determining unit are configured to perform the steps of the method provided in the first aspect.

According to a third aspect, an embodiment of the present invention provides a computer-readable storage medium. A program stored in the computer-readable storage medium includes an instruction used to perform the method provided in the first aspect.

According to a fourth aspect, an embodiment of the present invention provides a zero intermediate frequency radio receiver. The zero intermediate frequency radio receiver includes a preprocessing circuit and a digital signal processor. The digital signal processor is configured to read an instruction stored in a computer-readable storage medium, to determine a calibration parameter of the zero intermediate frequency radio receiver.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
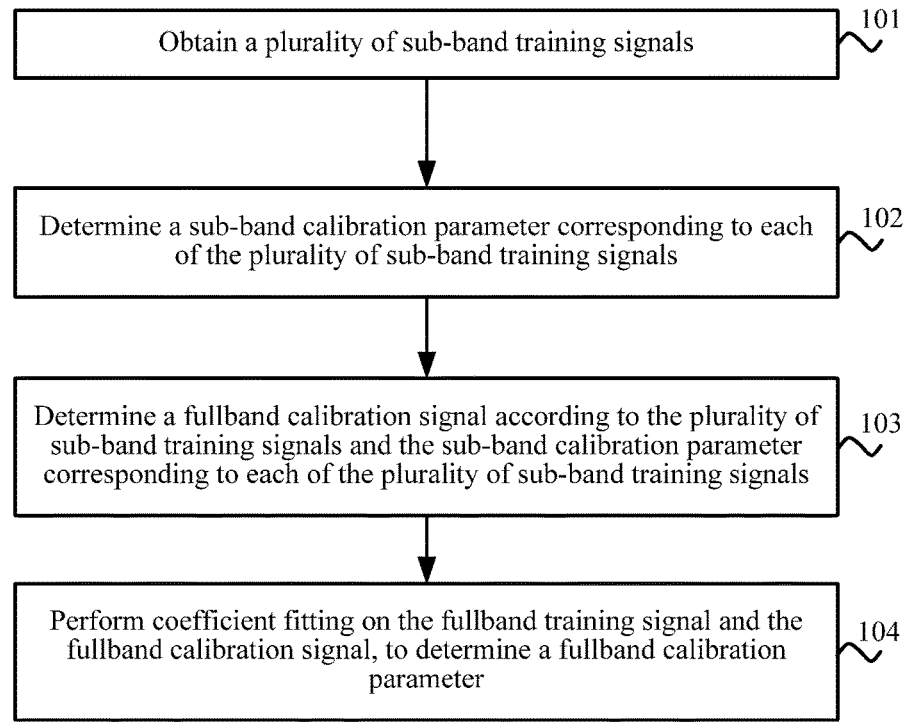
FIG. 1 is a schematic flowchart of a method for determining a calibration parameter of a zero intermediate frequency radio receiver according to an embodiment of the present invention.

FIG. 1 is a schematic flowchart of a method for determining a calibration parameter of a zero intermediate frequency radio receiver according to an embodiment of the present invention.

101: Obtain a plurality of sub-band training signals. A sum of the plurality of sub-band training signals is a fullband training signal.

102: Determine a sub-band calibration parameter corresponding to each of the plurality of sub-band training signals.

103: Determine a fullband calibration signal according to the plurality of sub-band training signals and the sub-band calibration parameter corresponding to each of the plurality of sub-band training signals.

104: Perform coefficient fitting on the fullband training signal and the fullband calibration signal, to determine a fullband calibration parameter.

According to the method shown in FIG. 1, because sub-band calibration parameters are obtained according to a plurality of different sub-band training signals, aliasing between an image signal and a training signal can be reduced. Therefore, a speed and precision of determining a calibration parameter can be improved.

Specifically, the determining a fullband calibration signal according to the plurality of sub-band training signals and the sub-band calibration parameter corresponding to each of the plurality of sub-band training signals includes: determining a plurality of sub-band calibration signals according to the plurality of sub-band training signals and the sub-band calibration parameter corresponding to each of the plurality of sub-band training signals; and determining a sum of the plurality of sub-band calibration signals as the fullband calibration signal. Assuming that an $i^{th}$ sub-band training signal is one of the plurality of sub-band training signals, an $i^{th}$ sub-band calibration signal may be determined according to the $i^{th}$ sub-band training signal and a sub-band calibration parameter corresponding to the $i^{th}$ sub-band training signal. Specifically, filtering may be performed on the $i^{th}$ sub-band training signal, to obtain the $i^{th}$ sub-band calibration signal. A coefficient used during the filtering is the sub-band calibration parameter corresponding to the $i^{th}$ sub-band training signal.

Specifically, the determining a sub-band calibration parameter corresponding to each of the plurality of sub-band training signals includes: determining, through frequency-selective blind image calibration, the sub-band calibration parameter corresponding to each of the plurality of sub-band training signals.

Optionally, in an embodiment, bandwidths of any two of the plurality of sub-band training signals are equal. In this way, bandwidths of the sub-band training signals are equal, thereby avoiding an increase in computation complexity caused by a bandwidth difference. For example, if bandwidths of the sub-band training signals are different, adjustment needs to be performed for different bandwidths in a computation process, increasing the computation complexity.

Optionally, in an embodiment, the obtaining a plurality of sub-band training signals includes: obtaining the plurality of sub-band training signals from a training signal generating device. In this way, no additional circuit needs to be disposed in the receiver. In another embodiment, the obtaining a plurality of sub-band training signals includes: generating the plurality of sub-band training signals.

The following describes the present invention with reference to specific embodiments. It may be understood that the specific embodiments are merely for helping a person skilled in the art better understand the present invention rather than limiting the present invention.

The fullband training signal is a wideband training signal. For ease of understanding, this embodiment is described by using a 100 MHz fullband training signal as an example. It may be understood that the fullband training signal having a bandwidth of 100 MHz is merely an example of a wideband training signal. The bandwidth of the wideband training signal may alternatively be another bandwidth. For example, the bandwidth of the wideband training signal may be a bandwidth of an LTE carrier frequency, a bandwidth of a WCDMA carrier frequency, or the like. The training signal may be a random signal or a particular signal such as a sinusoidal signal. This is not limited in the present invention. The fullband training signal may be equally divided into two sub-band training signals: an upper sub-band training signal (also referred to as an "upper sideband training signal") and a lower sub-band training signal (also referred to as a "lower sideband training signal"). A bandwidth of the upper sideband training signal is 50 MHz, and a bandwidth of the lower sideband training signal is 50 MHz.

The upper sideband training signal and the lower sideband training signal can be obtained when the radio receiver receives no radio frequency signal. The upper sub-band training signal and the lower sub-band training signal are separately obtained. For example, the upper sub-band training signal and the lower sub-band training signal may be separately obtained at the time of delivery of the radio receiver, to determine the fullband calibration parameter, so that the radio receiver calibrates a received radio frequency signal by using the fullband calibration parameter in subsequent operations. For another example, the radio receiver may determine whether a radio frequency signal is being received, and therefore can obtain the upper sideband training signal and the lower sideband training signal when determining that no radio frequency signal is being received, to determine the fullband calibration parameter.

After receiving the upper sideband training signal and the lower sideband training signal, the radio receiver performs same processing on the sideband training signals. The following provides descriptions by using the upper sideband training signal as an example. A sub-band calibration parameter (referred to as an "upper sideband calibration parameter" hereinafter) corresponding to the upper sideband training signal is extracted through the frequency-selective blind image calibration. After the upper sideband calibration parameter is determined, the upper sideband calibration parameter and the upper sideband training signal may be used to determine an upper sideband calibration signal. Specifically, filtering is performed on the upper sideband training signal to obtain the upper sideband calibration signal. A coefficient used during the filtering is the upper sideband calibration parameter. A lower sideband calibration signal can be determined by using the same method according to the lower sideband training signal.

After the upper sideband calibration signal and the lower sideband calibration signal are determined, the upper sideband calibration signal and the lower sideband calibration signal may be combined into a fullband calibration signal. The fullband calibration signal is a sum of the upper sideband calibration signal and the lower sideband calibration signal. Then, coefficient fitting is performed on the fullband training signal and the calibration signal, to determine the fullband calibration parameter. In this way, the determined fullband calibration parameter may be used to calibrate the received radio frequency signal, to reduce impact of a generated image signal on the received signal.

An embodiment of the present invention further provides a zero intermediate frequency radio receiver. The zero intermediate frequency radio receiver includes an obtaining unit and a determining unit.

The obtaining unit is configured to obtain a plurality of sub-band training signals. A sum of the plurality of sub-band training signals is a fullband training signal.

The determining unit is configured to determine a sub-band calibration parameter corresponding to each of the plurality of sub-band training signals.

The determining unit is further configured to determine a fullband calibration signal according to the plurality of sub-band training signals and the sub-band calibration parameter corresponding to each of the plurality of sub-band training signals.

The determining unit is further configured to perform coefficient fitting on the fullband training signal and the fullband calibration signal, to determine a fullband calibration parameter.

Because the zero intermediate frequency radio receiver can obtain the sub-band calibration parameter corresponding to each sub-band training signal according to the plurality of different sub-band training signals, aliasing between an image signal and a training signal can be reduced. Therefore, a speed and precision of determining a calibration parameter can be improved.

Specifically, the determining unit is specifically configured to: determine a plurality of sub-band calibration signals according to the plurality of sub-band training signals and the sub-band calibration parameter corresponding to each of the plurality of sub-band training signals; and determine a sum of the plurality of sub-band calibration signals as the fullband calibration signal.

Specifically, the determining unit is specifically configured to determine, through frequency-selective blind calibration, the sub-band calibration parameter corresponding to each of the plurality of sub-band training signals.

Optionally, in an embodiment, the obtaining unit is specifically configured to obtain the plurality of sub-band training signals from a training signal generating device. Optionally, in another embodiment, the zero intermediate frequency radio receiver may further include a training signal generating unit, configured to generate a plurality of training signals. The obtaining unit is specifically configured to obtain the plurality of training signals from the training signal generating unit.

Figure 2:
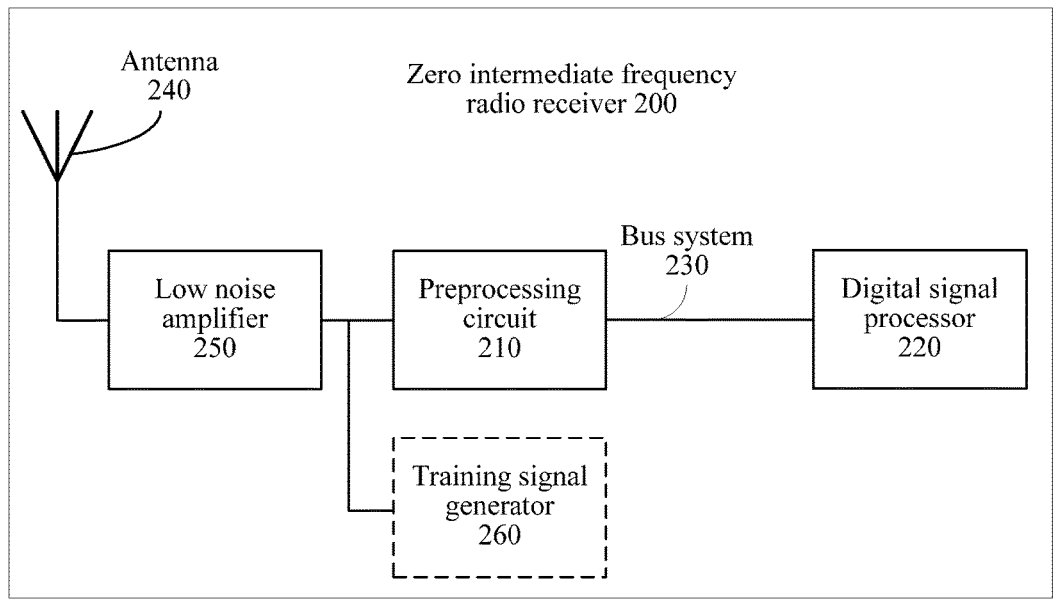
FIG. 2 is a structural block diagram of a zero intermediate frequency radio receiver according to an embodiment of the present invention.

FIG. 2 is a structural block diagram of a zero intermediate frequency radio receiver according to an embodiment of the present invention. The zero intermediate frequency radio receiver shown in FIG. 2 can perform various steps of the method shown in FIG. 1. As shown in FIG. 2, the zero intermediate frequency radio receiver 200 may include a preprocessing circuit 210 and a digital signal processor 220. Various components in the zero intermediate frequency radio receiver 200 are coupled together by using a bus system 230. In addition to a data bus, the bus system 230 may further include a power bus, a control bus, a status signal bus, and the like. However, for clear description, various buses in FIG. 2 are marked as the bus system 230. In addition, the zero intermediate frequency radio receiver 200 further includes an antenna 240 configured to receive a radio frequency signal and a low noise amplifier 250 configured to amplify the radio frequency signal received by the antenna 240.

The preprocessing circuit 210 is configured to: receive a plurality of sub-band training signals, and perform preprocessing on the plurality of sub-band training signals, to determine a plurality of processed sub-band training signals. The preprocessing includes demodulation, low-pass filtering, and digital-to-analog conversion, and a sum of the plurality of processed sub-band training signals is a processed fullband training signal.

The digital signal processor 220 is configured to determine a sub-band calibration parameter corresponding to each of the plurality of processed sub-band training signals.

The digital signal processor 220 is further configured to determine a fullband calibration signal according to the plurality of processed sub-band training signals and the sub-band calibration parameter corresponding to each of the plurality of processed sub-band training signals.

The digital signal processor 220 is further configured to perform coefficient fitting on the processed fullband training signal and the fullband calibration signal, to determine a fullband calibration parameter.

Because the zero intermediate frequency radio receiver can obtain the sub-band calibration parameter corresponding to each sub-band training signal according to the plurality of different sub-band training signals, aliasing between an image signal and a training signal can be reduced. Therefore, a speed and precision of determining a calibration parameter can be improved.

Figure 3:
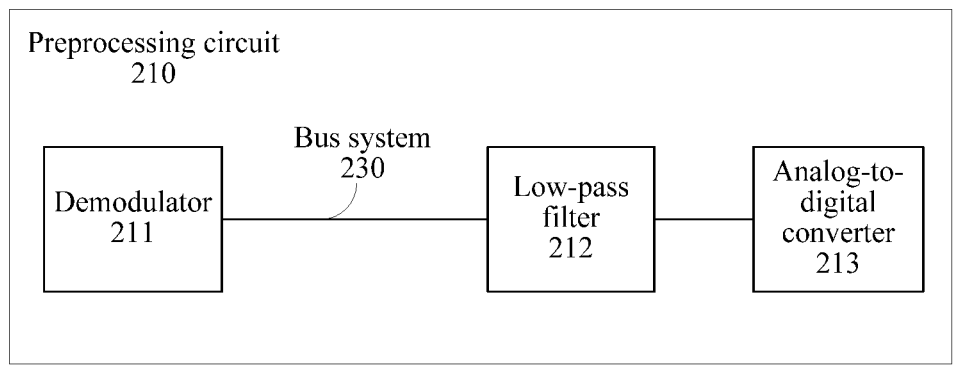
FIG. 3 is a structural block diagram of a preprocessing circuit.

Specifically, the preprocessing circuit shown in FIG. 2 can be implemented by using a demodulator, a low-pass filter, and an analog-to-digital converter. FIG. 3 is a structural block diagram of the preprocessing circuit. As shown in FIG. 3, the preprocessing circuit 210 includes a demodulator 211, a low-pass filter 212, and a digital-to-analog converter 213. Various devices in the preprocessing circuit 210 can also be coupled together by using the bus system 230.

The demodulator 211 is configured to receive the plurality of sub-band training signals. Specifically, the plurality of sub-band training signals are separately input to the demodulator 211. After the demodulator 211 demodulates the plurality of sub-band training signals, the low-pass filter 212 performs low-pass filtering on the plurality of sub-band training signals, and then the analog-to-digital converter 213 performs analog-to-digital conversion to obtain the plurality of processed sub-band training signals.

Specifically, the digital signal processor 220 is specifically configured to: determine a plurality of sub-band calibration signals according to the plurality of processed sub-band training signals and the sub-band calibration parameter corresponding to each of the plurality of processed sub-band training signals; and determine a sum of the plurality of sub-band calibration signals as the fullband calibration signal.

Specifically, the digital signal processor 220 is specifically configured to determine, through frequency-selective blind calibration, the sub-band calibration parameter corresponding to each of the plurality of processed sub-band training signals.

Optionally, in an embodiment, the preprocessing circuit 210 is configured to obtain the plurality of sub-band training signals from a training signal generating device. Specifically, the preprocessing circuit 210 may be connected to the training signal generating device by using an interface 214. In this way, the calibration parameter can be determined without disposing an additional circuit in the receiver. Optionally, in another embodiment, the zero intermediate frequency radio receiver 200 may further include a training signal generator 260. The training signal generator 260 is coupled to the preprocessing circuit. The training signal generator 260 is configured to generate the plurality of sub-band training signals. The training signal generator 260 may further include a switch, configured to control a time of inputting the plurality of sub-band training signals to the preprocessing circuit 210.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a calibration parameter of a zero intermediate frequency radio receiver, wherein the method comprises:
    obtaining a plurality of sub-band training signals, wherein a sum of the plurality of sub-band training signals is a fullband training signal;
    determining a sub-band calibration parameter corresponding to each of the plurality of sub-band training signals;
    determining a fullband calibration signal according to the plurality of sub-band training signals and the sub-band calibration parameter corresponding to each of the plurality of sub-band training signals; and
    performing coefficient fitting on the fullband training signal and the fullband calibration signal, to determine a fullband calibration parameter.

2. The method according to claim 1, wherein the determining a fullband calibration signal according to the plurality of sub-band training signals and the sub-band calibration parameter corresponding to each of the plurality of sub-band training signals comprises:
    determining a plurality of sub-band calibration signals according to the plurality of sub-band training signals and the sub-band calibration parameter corresponding to each of the plurality of sub-band training signals; and
    determining a sum of the plurality of sub-band calibration signals as the fullband calibration signal.

3. The method according to claim 1, wherein the determining a sub-band calibration parameter corresponding to each of the plurality of sub-band training signals comprises:
    determining, through frequency-selective blind image calibration, the sub-band calibration parameter corresponding to each of the plurality of sub-band training signals.

4. The method according to claim 1, wherein bandwidths of any two of the plurality of sub-band training signals are equal.

5. The method according to claim 1, wherein the obtaining a plurality of sub-band training signals comprises:
   obtaining the plurality of sub-band training signals from a training signal generating device.

6. A zero intermediate frequency radio receiver, wherein the zero intermediate frequency radio receiver comprises:
   an obtaining unit, configured to obtain a plurality of sub-band training signals, wherein a sum of the plurality of sub-band training signals is a fullband training signal; and
   a determining unit, configured to determine a sub-band calibration parameter corresponding to each of the plurality of sub-band training signals, wherein
   the determining unit is further configured to determine a fullband calibration signal according to the plurality of sub-band training signals and the sub-band calibration parameter corresponding to each of the plurality of sub-band training signals; and
   the determining unit is further configured to perform coefficient fitting on the fullband training signal and the fullband calibration signal, to determine a fullband calibration parameter.

7. The zero intermediate frequency radio receiver according to claim 6, wherein the determining unit is specifically configured to: determine a plurality of sub-band calibration signals according to the plurality of sub-band training signals and the sub-band calibration parameter corresponding to each of the plurality of sub-band training signals; and determine a sum of the plurality of sub-band calibration signals as the fullband calibration signal.

8. The zero intermediate frequency radio receiver according to claim 6, wherein the determining unit is specifically configured to determine, through frequency-selective blind image calibration, the sub-band calibration parameter corresponding to each of the plurality of sub-band training signals.

9. The zero intermediate frequency radio receiver according to claim 6, wherein the obtaining unit is specifically configured to obtain the plurality of sub-band training signals from a training signal generating device.

10. The zero intermediate frequency radio receiver according to claim 6, wherein bandwidths of any two of the plurality of sub-band training signals are equal.

11. A zero intermediate frequency radio receiver, wherein the zero intermediate frequency radio receiver comprises:

a preprocessing circuit, configured to: receive a plurality of sub-band training signals, and perform preprocessing on the plurality of sub-band training signals, to determine a plurality of processed sub-band training signals, wherein the preprocessing comprises demodulation, low-pass filtering, and analog-to-digital conversion, and a sum of the plurality of processed sub-band training signals is a processed fullband training signal; and a digital signal processor, configured to determine a sub-band calibration parameter corresponding to each of the plurality of processed sub-band training signals, wherein the digital signal processor is further configured to determine a fullband calibration signal according to the plurality of processed sub-band training signals and the sub-band calibration parameter corresponding to each of the plurality of processed sub-band training signals; and the digital signal processor is further configured to perform coefficient fitting on the processed fullband training signal and the fullband calibration signal, to determine a fullband calibration parameter.

12. The zero intermediate frequency radio receiver according to claim 11, wherein the digital signal processor is specifically configured to: determine a plurality of sub-band calibration signals according to the plurality of processed sub-band training signals and the sub-band calibration parameter corresponding to each of the plurality of processed sub-band training signals; and determine a sum of the plurality of sub-band calibration signals as the fullband calibration signal.

13. The zero intermediate frequency radio receiver according to claim 11, wherein the digital signal processor is specifically configured to determine, through frequency-selective blind calibration, the sub-band calibration parameter corresponding to each of the plurality of processed sub-band training signals.

14. The zero intermediate frequency radio receiver according to claim 11, wherein the preprocessing circuit is configured to obtain the plurality of sub-band training signals from a training signal generating device.

15. The zero intermediate frequency radio receiver according to claim 11, wherein bandwidths of any two of the plurality of sub-band training signals are equal.

* * * * *